United States Patent [19]
Lundgren

[11] Patent Number: 6,024,458
[45] Date of Patent: Feb. 15, 2000

[54] OPTICAL SHIELD WITH GRADUATED CONICAL BAFFLES

[75] Inventor: Mark A. Lundgren, Corona, Calif.

[73] Assignee: Boeing North American, Seal Beach, Calif.

[21] Appl. No.: 09/173,604

[22] Filed: Oct. 16, 1998

[51] Int. Cl.$^7$ .............................. G02B 27/00; G02B 21/00
[52] U.S. Cl. .......................... 359/613; 359/399; 359/601; 359/611
[58] Field of Search ...................................... 359/236, 399, 359/601–614; 250/229, 574; 356/236, 339, 439

[56] References Cited

U.S. PATENT DOCUMENTS

| | | | |
|---|---|---|---|
| 1,789,230 | 1/1931 | Heaton | 359/236 |
| 1,960,097 | 5/1934 | Barnard et al. | 356/236 |
| 3,170,068 | 2/1965 | Petriw et al. | 356/339 |
| 3,205,361 | 9/1965 | Albus | 250/229 |
| 4,106,856 | 8/1978 | Babish | 359/602 |
| 4,217,026 | 8/1980 | Radovich | 359/611 |
| 4,542,963 | 9/1985 | Linlor | 359/399 |
| 4,929,055 | 5/1990 | Jones | 359/601 |
| 5,120,975 | 6/1992 | Fedor et al. | 250/554 |
| 5,121,251 | 6/1992 | Edwards | 359/399 |
| 5,189,554 | 2/1993 | Vanasse et al. | 359/601 |
| 5,191,469 | 3/1993 | Margolis | 359/399 |
| 5,225,931 | 7/1993 | Stavroudis | 359/601 |

FOREIGN PATENT DOCUMENTS

| | | | |
|---|---|---|---|
| 213315 | 9/1909 | Germany | 359/612 |

*Primary Examiner*—Thong Nguyen
*Attorney, Agent, or Firm*—Alston & Bird LLP

[57] ABSTRACT

An optical shield for preventing stray light from reaching the focal plane of an optical device includes a tubular housing defining an aperture at one end for admitting light to pass through the housing to the focal plane, and a plurality of annular conical baffles attached to the housing wall and axially spaced along the housing between the aperture and the focal plane. In one embodiment, the housing wall is conical and the baffles are all aimed at a location on the housing wall which is between the aperture and a forward-most one of the baffles adjacent the aperture, such that the rearward-facing surfaces of the baffles are shielded from direct and reflected light. The baffles are spaced sufficiently closely and are long enough that the baffles shield the focal plane from those portions of the housing wall that are directly illuminable by light passing through the aperture.

11 Claims, 3 Drawing Sheets

6,024,458

OPTICAL SHIELD WITH GRADUATED CONICAL BAFFLES

STATEMENT OF GOVERNMENT RIGHTS IN THE INVENTION

This invention was made with Government support under contract number DASG60-90-C-0165 awarded by the Army. The Government has certain rights in this invention.

FIELD OF THE INVENTION

The present invention relates to shields for reducing unwanted light from reaching a focal plane of an optical device or sensor. More particularly, the invention relates to an optical shield of tubular form having internal baffles for intercepting unwanted out-of-field light rays so that such rays do not reach the focal plane.

BACKGROUND OF THE INVENTION

In a variety of types of optical instruments, it is desired that light rays entering an instrument from a range of predetermined directions generally parallel to the axis of the instrument be allowed to reach a focal plane of an optical device or detector. However, it is undesirable for light rays entering the instrument from more extreme angles to be able to reach the focal plane because such out-of-field light rays degrade the desired in-field image. The desired image can be thought of as a signal and the out-of-field light rays reaching the focal plane can be thought of as noise. Thus, performance of an optical instrument is enhanced by increasing the signal-to-noise ratio.

One method for increasing the signal-to-noise ratio is to place an optical shield ahead of the focal plane. An optical shield is designed to deflect or block out-of-field light so that it cannot easily reach the focal plane. Commonly, an optical shield is formed as a tube having a plurality of annular baffles attached to its inner surface and spaced along the length of the tube. One end of the tube admits light through an aperture, and a focal plane is located at the other end of the tube. The baffles are located between the aperture and the focal plane. The baffles extend inwardly toward the center axis of the tube. Frequently, the baffles are coated with an absorptive material such as black paint in order to further reduce unwanted radiation of out-of-field light. Alternatively, the baffles may be reflective on one or both of their surfaces and configured so that out-of-field light is reflected in directions away from the focal plane.

In many cases, insufficient attention is given to light that is scattered in random directions by out-of-field light striking interior surfaces of an optical shield. Because no object can be perfectly absorptive or perfectly reflective, there is always some amount of light scattered in random directions when light strikes an inner surface of an optical shield. If a surface struck by out-of-field light is in view of the focal plane, there inevitably will be some amount of light scattered from that surface to the focal plane. This factor has not been taken into account in the design of some existing optical shields. For example, in some existing optical shields, as illustrated in FIG. 1, light can be reflected off one baffle and strike a rear surface (i.e., the surface facing the focal plane) of the preceding baffle which is in view of the focal plane. Even though this reflected light may not be specularly reflected to the focal plane, some of the light will be scattered to the focal plane.

SUMMARY OF THE INVENTION

The amount of out-of-field light reaching a focal plane of an optical device is reduced by an optical shield in accordance with the present invention, having baffles that are configured such that their rear surfaces (i.e., those facing the focal plane) are not directly illuminated by light entering the shield, and are not illuminated by light reflected from adjacent baffles. Instead, light striking the forward surface of a baffle (i.e., the surface facing away from the focal plane) is trapped in a corner between the baffle and the tubular wall to which the baffle is attached so that it cannot be reflected back to the preceding baffle. Additionally, the baffles are configured so that each baffle shields the focal plane from light reflected or scattered by the portion of the tubular wall that is forward of the baffle and directly illuminated by light passing through the aperture in the shield. Thus, the baffles substantially prevent light from being reflected or scattered from the tubular wall or the surfaces of the baffles to the focal plane.

In accordance with a preferred embodiment of the invention, the optical shield comprises a housing defined by a generally tubular wall having opposite forward and rear ends, the forward end defining an aperture for admitting light into the housing, the rear end defining a focal plane which receives light entering through the aperture along directions generally parallel to a longitudinal axis of the housing. A plurality of conical baffles are axially spaced apart within the housing and include a forwardmost baffle adjacent the aperture, each baffle being formed by a conical wall attached to the wall of the housing and extending generally inwardly and forwardly therefrom and having a forward-facing surface and a rearward-facing surface. The conical wall of each baffle is aimed toward a location between the aperture and the forwardmost baffle. Thus, the baffles are "graduated" in that the cone angle of each succeeding baffle in the rearward direction toward the focal plane is smaller than the cone angle of the preceding baffle. The conical wall of each baffle and the housing wall form an acute corner for trapping light and preventing reflection of light from the forward-facing surface of the baffle to the rearward-facing surface of a forwardly adjacent baffle. Accordingly, the rearward-facing surfaces of all of the baffles are shielded from direct and reflected light.

Advantageously, the conical wall of each baffle has a length sufficient to shield the focal plane from light that is reflected or scattered by the portion of the housing wall which is forwardly adjacent to the baffle and which is directly illuminable by light passing through the aperture.

To facilitate trapping light rays in the corners between the baffles and the housing wall, the housing preferably has a diameter which increases in the rearward direction. In a preferred embodiment of the invention, the housing wall is conical and has a maximum diameter at the rear end that contains the focal plane. The conical shape of the housing wall enhances the acuteness of the angles between the baffles and the housing wall so that light rays striking the baffles and reflecting onto the housing wall, or vice versa, are less apt to escape the corners.

In a preferred embodiment of the invention, the housing is closed at the rear end by a cup-shaped end cap joined to the conical housing wall at the maximum-diameter location and extending rearwardly therefrom. The end cap is formed of a conical section joined to an end wall. The end wall is preferably parallel to the focal plane. The end cap prevents light from entering the shield through the rear end, and also serves as a mounting structure to which an optical device can be attached.

By virtue of the configuration of the optical shield with graduated baffles aimed at a location inside the housing, high signal-to-noise ratios are realizable even without any special optical coatings for increasing the absorption of out-of-field light. Additionally, relatively few baffles are required in comparison to optical shields having conventional straight or conical baffles, and therefore the optical shield can be made with reduced weight and at lower cost than such conventional optical shields.

BRIEF DESCRIPTION OF THE DRAWINGS

The above and other objects, features, and advantages of the invention will become more apparent from the following description of certain preferred embodiments thereof, when taken in conjunction with the accompany drawings in which.

DETAILED DESCRIPTION OF THE DRAWINGS

The invention is now explained by reference to certain preferred embodiments thereof. It is to be understood, however, that the invention is not limited to these embodiments.

Figure 1:
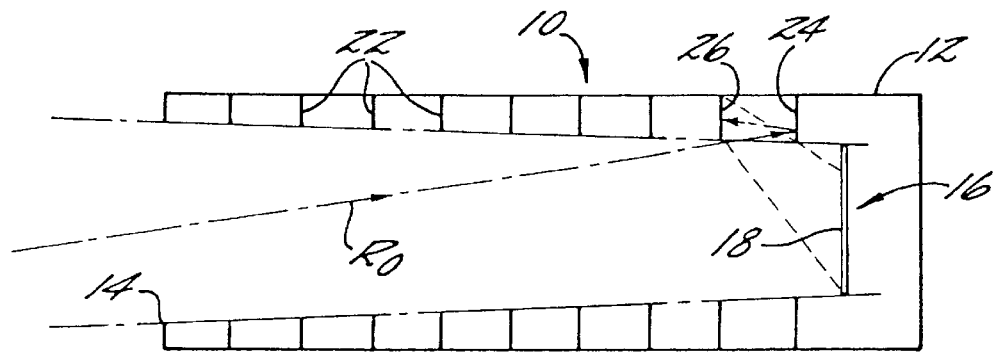
FIG. 1 is a sectioned side elevational view of a conventional optical shield having straight baffles, showing out-of-field light rays reflecting from one baffle onto a portion of an adjacent baffle that is in view of the focal plane.

With reference to FIG. 1, a conventional optical shield 10 is shown in sectioned side elevational view. The shield 10 includes a tubular housing 12 which has an aperture 14 at one end for admitting light into the housing. An optical device 16 is mounted at the other end of the housing 12. The optical device 16 defines a focal plane 18 for receiving light passing through the aperture 14. The shield 10 also includes a plurality of annular baffles 22 affixed to the inner surface of the housing 12 and spaced apart between the aperture 14 and the focal plane 18. The baffles 22 are intended to reduce the amount of out-of-field light which reaches the focal plane 18 after entering the aperture 14. Without the baffles 22, out-of-field light rays would be free to specularly reflect off the wall of the housing 12 onto the focal plane 18. The baffles 18 block many of these out-of-field rays before they reach the wall of the housing and/or after they have reflected off the housing wall.

However, unwanted out-of-field light is still capable of reaching the focal plane 18 by being scattered from rearward-facing surfaces of the baffles 22 which are in view of the focal plane. As shown in FIG. 1, for example, an out-of-field light ray $R_o$ striking the forward-facing surface 24 of the rearwardmost baffle 22 is reflected onto the rearward-facing surface 26 of the preceding baffle 22. This rearward-facing surface 26 is in view of the focal plane 18 as indicated by the broken lines and, accordingly, some light will be scattered from the surface 26 onto the focal plane.

Figure 2:
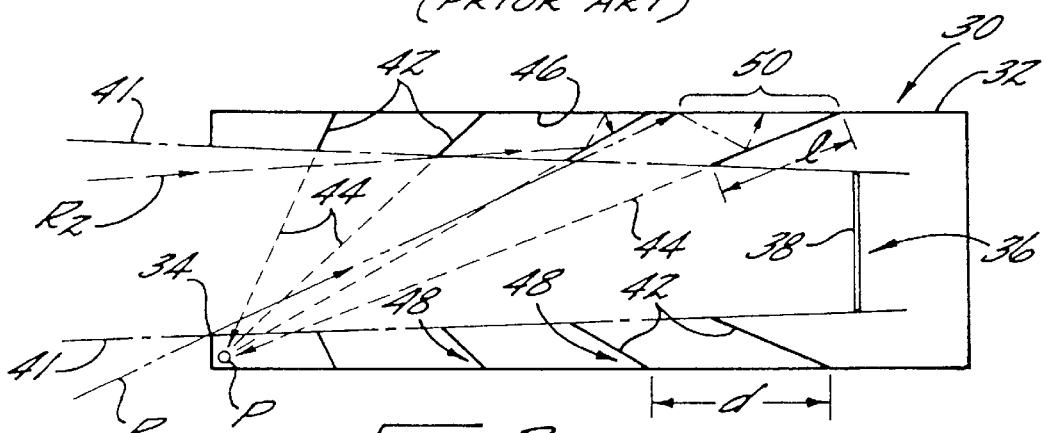
FIG. 2 is a sectioned side elevational view of an optical shield in accordance with one preferred embodiment of the invention, showing out-of-field rays reflecting off one of the baffles and the housing wall and being directed through multiple reflections into the corners between the baffles and the housing wall.

Among the objects of the present invention are to substantially prevent specular reflection of out-of-field light onto the focal plane, and also to significantly reduce the amount of out-of-field light scattered onto the focal plane by inner surfaces of an optical shield. FIG. 2 depicts one preferred embodiment of an optical shield 30 in accordance with the invention. The shield includes a tubular housing 32 having an aperture 34 at a forward end of the housing for admitting light into the housing. The opposite rear end of the housing 32 mounts an optical device 36, such as an optical detector, which has a focal plane 38. Thus, light passing through the aperture 34 in directions generally parallel to the longitudinal axis of the housing 32 (i.e., in-field light) passes through the shield unobstructed and strikes the focal plane 38. The outer boundaries of the field are denoted by broken lines 41.

To prevent light which enters the aperture 34 at more-extreme angles from reflecting or being scattered onto the focal plane 38, the shield 30 includes a plurality of generally conical baffles 42 affixed to the wall of the housing 32 and axially spaced apart between the aperture 34 and the focal plane 38. The baffles 42 are all aimed at a location P that is between the aperture 34 and the forwardmost baffle closest to the aperture, as indicated by the dashed lines 44. Accordingly, the baffles 42 are "graduated" in that the cone angle of each succeeding baffle in the rearward direction toward the focal plane 38 is smaller than the cone angle of the preceding baffle. Because the baffles 42 are aimed at the location P, the rearward-facing surfaces (i.e., the surfaces facing the focal plane 38) of the baffles 42 cannot be directly illuminated by light passing through the aperture 34, as illustrated for example by the extreme ray $R_1$ for the third baffle (counting from the aperture rearward) which misses the rearward-facing surface of the third baffle and strikes the tubular wall 46 of the housing 32 from which it is reflected onto the forward-facing surface of the fourth baffle.

Additionally, because the baffles 42 are aimed at the location P just inside the housing 32, each baffle is angled forwardly at an angle sufficiently large to prevent light from being reflected off a forward-facing surface of one baffle onto the rearward-facing surface of the preceding baffle. For example, the only slightly out-of-field light ray $R_2$ striking the forward-facing surface of the third baffle is reflected onto the tubular wall 46 of the housing 32, and from there is reflected back onto the forward-facing surface of the third baffle, and so on. Similarly, light from the extreme ray $R_1$, after being reflected off the housing wall 46, strikes the forward-facing surface of the fourth baffle at a less-acute angle but is still reflected back onto the tubular wall 46, then back onto the baffle, and so on toward the corner 48 between the baffle 42 and the housing wall 46. The acute angular junctions or corners 48 between the baffles 42 and the housing wall 46 thus tend to "trap" light and prevent the light from reaching the focal plane 38.

It will also be noted that the axial spacings between adjacent baffles 42 and the lengths of the baffles 42 are such that each baffle shields the focal plane 38 from the portion of the housing wall 46 that is just forward of the baffle and is directly illuminable by light passing through the aperture 34. This is illustrated in FIG. 2 by the extreme ray $R_1$ for the third baffle which strikes the housing wall 46 just rearward of the third baffle. The fourth baffle is spaced rearward from the third baffle by a distance d and has a length l. The distance d and length l are chosen such that the portion 50 of the housing wall 46 that is directly illuminable by light is not in view of the focal plane 38. The lengths of the other baffles 42 and their spacings from the preceding baffles are likewise selected so that the directly illuminable portions of the wall 46 are shielded from the focal plane.

Because the baffles 42 shield the focal plane from the housing wall 46, and the baffles are aimed at the location P just inside the housing so that their rearward-facing surfaces are in the shade, the optical shield 30 substantially prevents light from being reflected or scattered onto the focal plane 38 from the housing wall 46 or from the baffles 42. It will also be appreciated that the number of baffles can be reduced relative to a conventional straight-baffle shield such as the shield 10 of FIG. 1, thus potentially yielding benefits in terms of lower manufacturing cost and reduced weight for the optical shield 30.

Figure 3:
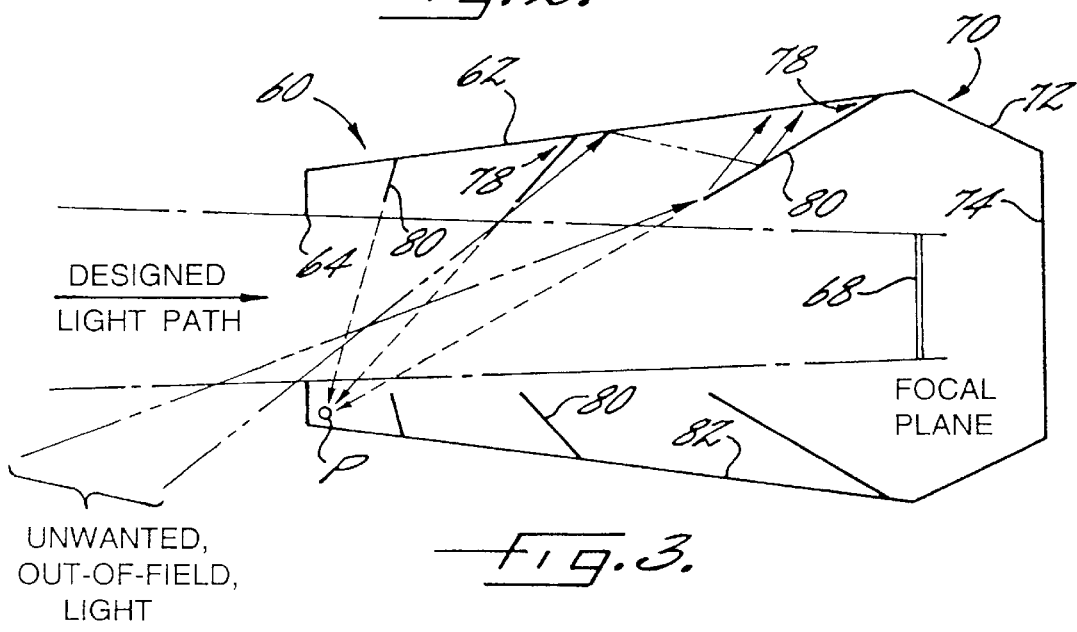
FIG. 3 is a view similar to FIG. 2, depicting another preferred embodiment of the invention having a conical housing.

FIG. 3 depicts another preferred embodiment of the invention. The optical shield 60 of FIG. 3 differs from the shield 30 primarily in the configuration of the housing. The tubular housing 62 of the shield 60 is generally conical such that the diameter increases in the rearward direction from a minimum diameter at the aperture 64 to a maximum diameter at the rear end at which a focal plane 68 is located. Preferably, the rearwardmost baffle 80 is located relative to the focal plane 68 such that the portion of the housing wall 82 between the rearwardmost baffle and the focal plane cannot be directly illuminated by light passing through the aperture 64. The rear end of the housing 62 is closed by a cup-shaped end cap 70 comprising a conical portion 72 and an end wall 74 which is generally parallel to the focal plane 68. The end cap 70 prevents light from entering the housing through the rear end, and also serves as a mounting structure to which an optical device can be attached.

As with the shield 30, the shield 60 has the baffles 80 all directed toward a point P between the aperture 64 and the forwardmost baffle, such that the baffles 80 and the housing wall 82 define smaller and smaller acute angles in the direction from the forward end to the rear end. The conical shape of the housing 62 yields more-acute corners 78 between the baffles 80 and the tubular housing wall 82, thus further facilitating the trapping of rays in the corners 78. Additionally, the conical housing shape enables the axial spacing between adjacent baffles to be increased relative to a cylindrical shield. As a result, the shield 60 requires only three baffles 80 rather than four baffles for the shield 30 of FIG. 2.

It will be noted that, for both of the shields 30 and 60, the axial spacings between the baffles need not be constant, but rather can be increased in the rearward direction toward the focal plane, as long as the lengths of the baffles are correspondingly increased toward the rear end to shield the focal plane from the directly illuminable portion of the tubular housing wall ahead of each baffle.

Figure 4:
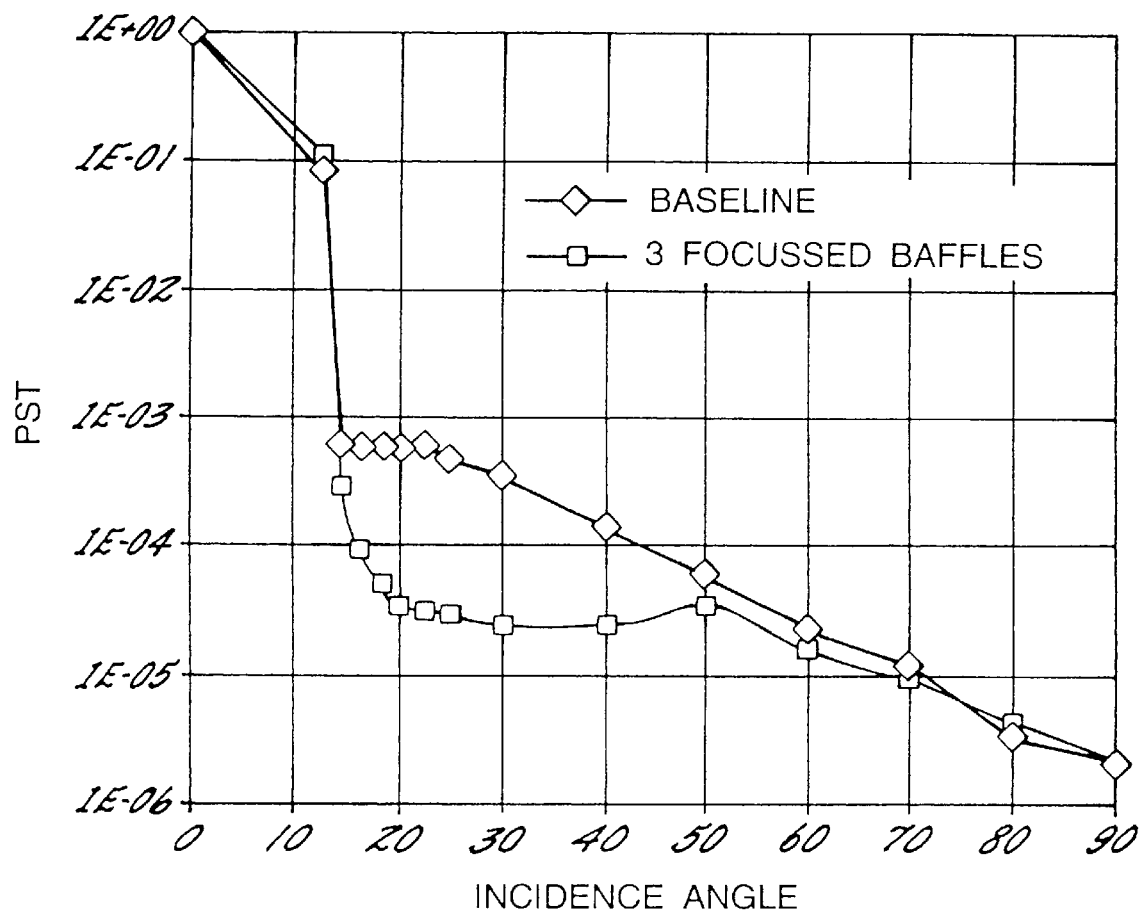
FIG. 4 is a graph comparing the predicted performance of an optical shield having three graduated baffles substantially as shown in FIG. 3, with the predicted performance of an optical shield having straight baffles substantially as shown in FIG. 1.

Mathematical modeling of optical shields in accordance with the invention predicts significantly improved efficiency relative to conventional optical shields having straight baffles or conical baffles with equal cone angles. For example, FIG. 4 depicts the predicted efficiency for an optical shield substantially as shown in FIG. 3, and the predicted efficiency for a conventional shield substantially as shown in FIG. 1, as a function of the incidence angle of light passing through the aperture. Both of the optical shields were modeled to have absorptive coatings such as black paint on their interior surfaces. The plotted parameter "PST" is the "point source transmittance" defined as the energy reaching the focal plane divided by the total energy available out-of-field. It can be seen that for a wide range of out-of-field incidence angles, for example from 15° to 70°, the optical shield with graduated baffles in accordance with the invention passes a substantially smaller fraction of stray light to the focal plane than the conventional baseline shield. Integrated over the entire range of incidence angle, the shield with graduated baffles passes about one-fifth the amount of out-of-field light to the focal plane as the conventional shield.

The mathematical models further predict that even when the shield with graduated baffles has a specular coating, such as Ebanol C, applied to its baffles and housing wall and the conventional shield has a diffuse coating, such as Nextel, applied to its baffles and housing wall, the shield with graduated baffles still has a significantly better efficiency than the conventional shield. Thus, optical shields of high efficiency can be made in accordance with the invention, without the necessity of providing special optical coatings on inner surfaces of the shields. Accordingly, the shields can be made more simply and potentially at lower cost than conventional shields employing special optical coatings, and maintenance costs associated with repainting the coated surfaces of shields are avoided.

Figure 5:
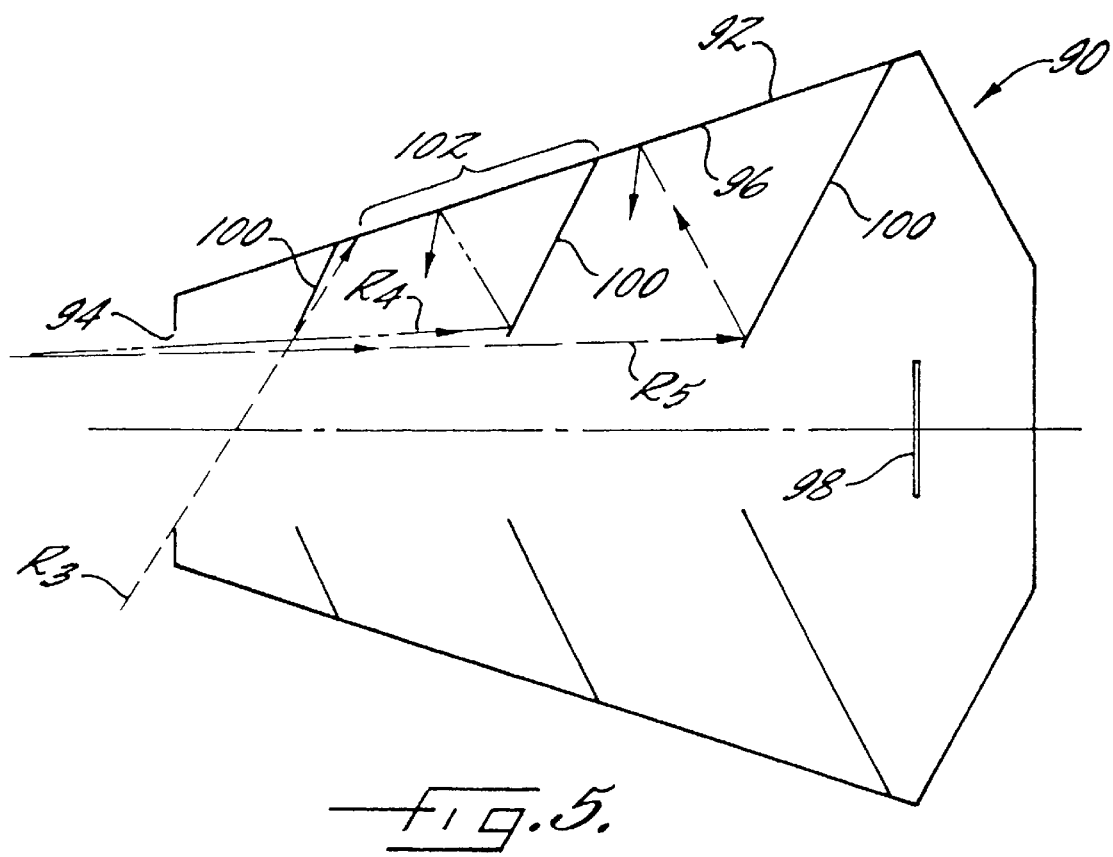
FIG. 5 is a sectioned side elevational view of yet another preferred embodiment of the invention.

FIG. 5 shows yet another preferred embodiment of the invention. The optical shield 90 of FIG. 5 includes a conical housing having a minimum diameter at the forward end which defines the aperture 94 and a maximum diameter at the rear end at which a focal plane 98 is located, and a plurality of conical baffles 100 which are aimed or graduated at various locations inside the housing such that the rearward-facing surfaces of the baffles 100 are shielded from direct illumination. Unlike the shields 30 and 60 which have their baffles all aimed at a single point just inside the housing, the shield 90 has its baffles 100 aimed at different points within the housing, most of which are not between the aperture 94 and the forwardmost baffle, such that the conical walls of the baffles 100 are substantially parallel to one another. The conical shape of the housing wall 96 facilitates shielding of the focal plane 98 from the wall 96 by the baffles 100. Thus, although a portion 102 of the conical wall between the first and second baffles 100 can be directly illuminated by light, as illustrated for example by the ray $R_3$, the second baffle is spaced sufficiently close to the first baffle and is long enough such that the focal plane 98 is shielded from the illuminated portion 102. The baffles 100 are angled forwardly at sufficiently steep angles that light cannot be reflected from one baffle to the rearward-facing surface of the preceding baffle, as illustrated by the extreme rays $R_4$ and $R_5$ for the second and third baffles, respectively. It will be appreciated that the embodiments of FIGS. 2 and 3 facilitate making the overall size of the shield smaller than the shield of FIG. 5, and thus may be preferred in certain applications where size of the shield must be minimized. However, the shield of FIG. 5 may enable improved efficiency relative to the shields of FIGS. 2 and 3, and hence may be preferred if size is not an important consideration.

The invention has been described by reference to certain preferred embodiments of the invention, and these embodiments have been described in considerable detail. Nevertheless, the invention is not limited to these embodiments, and various modifications and substitutions of equivalents will readily be comprehended by persons of ordinary skill in the art. It is intended that such modifications and substitutions be encompassed within the scope of the invention as set forth in the following claims.

What is claimed is:

1. A shield for an optical device, comprising:
   a housing defined by a generally tubular wall having opposite forward and rear ends, the forward end defining an aperture for admitting light into the housing, the housing being adapted to house said optical device proximate the rear end of the housing with a focal plane of the optical device facing the aperture for receiving in-field light; and a plurality of conical baffles axially spaced apart within the housing and including a forwardmost baffle adjacent the aperture, each baffle being formed by a conical wall attached to the wall of the housing and extending generally inwardly and forwardly therefrom and having a forward-facing surface and a rearward-facing surface, the conical walls of the baffles being aimed at the housing wall between the aperture and the forwardmost baffle such that the conical walls of the baffles and the housing wall form acute corners for trapping light and preventing reflection of light from the forward-facing surface of each baffle to the rearward-facing surface of a forwardly adjacent baffle, whereby the rearward-facing surfaces of all of the baffles are shielded from direct and reflected light.

2. The optical shield of claim 1, wherein a portion of the housing wall forwardly adjacent to each baffle is directly illuminable by light passing through the aperture, and wherein the conical wall of each baffle has a length sufficient to shield the focal plane from light reflected or scattered by said directly illuminable portion of the housing wall.

3. The optical shield of claim 2, wherein the housing has a diameter which increases in the rearward direction.

4. The optical shield of claim 3, wherein the housing wall is conical and the focal plane is located at a maximum diameter of the housing wall.

5. The optical shield of claim 4, wherein the housing is closed at the rear end by a cup-shaped end cap joined to the conical housing wall at the maximum-diameter location and extending rearwardly therefrom.

6. The optical shield of claim 1, wherein the baffles increase in length in the rearward direction.

7. A shield for an optical device, comprising:

a housing defined by a generally tubular wall having opposite forward and rear ends, the forward end defining an aperture for admitting light into the housing, the housing being adapted to house said optical device proximate the rear end of the housing with a focal plane of the optical device facing the aperture for receiving in-field light passing through the aperture and along a rearward direction generally parallel to a longitudinal axis of the housing, the tubular wall being conical and having a minimum diameter adjacent the forward end and a maximum diameter adjacent the rear end; and a plurality of conical baffles axially spaced apart within the housing, each baffle being formed by a conical wall attached to the wall of the housing and extending generally inwardly and forwardly therefrom and having a forward-facing surface and a rearward-facing surface, the conical walls of the baffles being angled forwardly such that light from any direction passing through the aperture and striking the forward-facing surface of the baffle is reflected onto the housing wall, and such that the rearward-facing surfaces of the baffles cannot be directly illuminated by light passing through the aperture.

8. The optical shield of claim 7, wherein the conical walls of the baffles are substantially parallel to one another.

9. The optical shield of claim 7, wherein the conical walls of the baffles are oriented at different angles.

10. The optical shield of claim 7, wherein the conical walls of the baffles are all aimed at a the housing wall between the aperture and a forwardmost one of the baffles.

11. The optical shield of claim 7, wherein a portion of the housing wall forwardly adjacent to at least one baffle is directly illuminable by light passing through the aperture, and wherein the conical wall of said at least one baffle has a length sufficient to shield the focal plane from said forwardly adjacent portion of the housing wall.

* * * * *